O. O. OZIAS.
AUTOMATIC WEIGHING DEVICE.
APPLICATION FILED MAY 28, 1910.

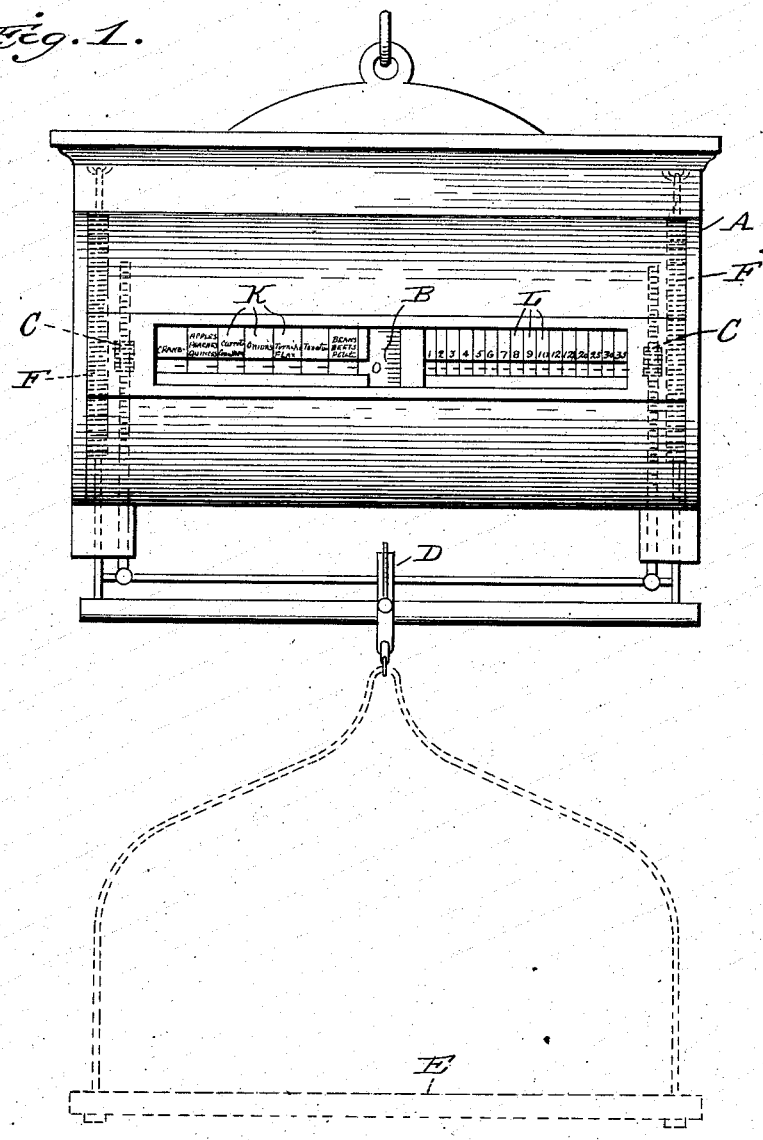

1,135,609.

Patented Apr. 13, 1915.
2 SHEETS—SHEET 2.

UNITED STATES PATENT OFFICE.

ORANGE O. OZIAS, OF DAYTON, OHIO.

AUTOMATIC WEIGHING DEVICE.

1,135,609.

Specification of Letters Patent. Patented Apr. 13, 1915.

Application filed May 28, 1910. Serial No. 563,948.

*To all whom it may concern:*

Be it known that I, ORANGE O. OZIAS, a citizen of the United States, residing at Dayton, in the county of Montgomery and State of Ohio, have invented certain new and useful Improvements in Automatic Weighing Devices; and I do hereby declare the following to be a full, clear, and exact description of the same, reference being had to the accompanying drawings, forming a part of this specification, and to the figures and letters of reference marked thereon.

This invention relates to that type of computing scales embodying a relatively large drum having graduations thereon indicating weight and values, said drum being suitably connected with the goods receiver whereby it is moved in proportion to the movement of the goods receiver to bring the indicating graduations to the indicating position, the drum and goods receiver being associated with suitable counter-balancing mechanism for counter-balancing the weight of the goods placed on the receiver, such for instance as the well known counter-balancing springs or a pendulum weight.

The object of the invention is to provide a scale of this type with which measured quantities of commodities may be determined and the price thereof indicated in a convenient and accurate manner, thus enabling the scale to be used for determining volumetric quantities with a valuation reckoned on the weight of the goods, the volumetric and value indications being simultaneously brought to the reading or indicating point by the movement of the goods receiver when the goods are placed thereon.

Referring to the accompanying drawings—Figure 1 is a conventional illustration of a well-known type of spring balanced scale in which the present invention has been embodied. Fig. 2 is an enlarged view of a section of the chart forming the indicating drum of the scale, and having associated therewith the names of the goods and the price per unit of weight.

The conventional scale illustrated embodies a casing or framing A, within which is journaled a relatively large drum seen through the indicating aperture at B, said drum being adapted to be rotated by pinions and rack bars shown in dotted lines at C, through connections D with the goods receiver E. The goods receiver and goods placed thereon are counter-balanced by coil spring shown in dotted lines at F, all of said parts being of well known mechanical construction and operating in the well known way. It is to be understood that the scale illustrated is only typical of that type of scale now commonly known as an automatic weighing device and that the counter-balancing means illustrated may be of other kind such, for instance, as the well known pendulum for counter-balancing loads of varying weight. Scales of this type as heretofore constructed have only been adapted for weighing in units of weight and price, no arrangement having been heretofore suggested which would permit of the scale being utilized for determining volumetric quantities in accordance with well recognized commercial standards of the day, such for instance as quarts, pecks, bushels, and fractions thereof employed in the sale of vegetables, etc. To permit of the scale being employed in the sale of goods in accordance with the recognized volumetric standards, the indicating drum is, in accordance with the present invention, provided with a chart having thereon columns of graduations of volumetric standards, the graduations in each column being previously calculated and the price for a given commodity is calculated by reference to the weight of a volumetric measure of that commodity. A sufficient number of columns are provided for indicating the particular vegetables or commodities which are to be handled by the scale and the graduations in each column or for each commodity are positioned without reference to the graduations in the other column but with reference only to the weight of that commodity for the given measure or fraction of the measure to be indicated.

Referring particularly to Fig. 2, it will be seen that the drum carries at one point, preferably a central point, graduations G indicating weight and in parallel columns H are graduations indicating volumetric quantities of various commodities, for instance, in the drawings adopted for illustrative purposes, the commodities to be handled are in the first column cranberries; in the second column apples, peaches, and quinces; in the third column carrots and corn meal; in the fourth column onions; in the fifth column turnips and flax seed; in the sixth column tomatoes, and in the seventh column beans, beets and potatoes.

The columns, it is obvious, may be increased in number as desired for the purpose of permitting the scale to handle a greater number of commodities having different weights for a unit of volumetric measure. The volumetric measurements adopted and indicated by the graduations in the columns are preferably well known standards of quarts and pecks and the graduations may be extended to indicate bushels and fractions of bushels.

The chart also carries graduated columns indicating values at fixed prices per pound, thus the columns "I" are columns of value indications reckoned at prices per pound ranging from one cent to ten cents and at 12, 12½, 20, 25, 30, and 35 cents per pound. These rates per unit of weight being, of course, selected to cover a range of prices at which the commodities sold by volumetric measure are ordinarily employed in commercial usage and may be varied in accordance with such usage.

In embodying the invention in an automatic weighing device the columns of graduations of volumetric measure, weight and value are, as before stated, on the indicating drum of the scale which is connected with and adapted to be moved in proportion to the movement of the goods receiver and the names of the commodities together with the rates or price per pound are preferably marked or located on the casing or fixed framing of the scale in proximity to the sight opening and in alinement with the columns of graduations on the drum, thus the names of the commodities are located in the spaces provided for that purpose and indicated at K in Fig. 1, while the prices per pound are located in the spaces provided for that purpose and indicated at L in said figure. In Fig. 2 these names and prices are shown above the columns of graduations in the relative positions occupied by them in the scale.

In making use of the scale to sell vegetables called for by a volumetric measure standard, a sufficient quantity is placed on the receiver to bring the scale to a balance with the graduation indicating the desired quantity at the reading or indicating point, and the rate per pound being known to the merchant he ascertains the value by referring to the figures of the proper value column appearing at the reading or indicating point.

Having thus described my invention, what I claim as new and desire to secure by Letters Patent of the United States is—

In a scale for simultaneously determining the weight, price and volumetric quantity of the goods being weighed, a chart having columns of graduations thereon extending parallel with the plane of its movement, and indicating respectively volumetric quantities, weight and values corresponding to volumetric quantities and weight, a fixed indicator with which all of said sets of graduations register, and fixed indices of the character of goods located in line with the columns of volumetric quantities and fixed indices of price located in line with the columns of value indication, the arrangement being such that corresponding volumetric, weight and value indications will simultaneously register with the fixed indicator.

ORANGE O. OZIAS.

Witnesses:
I. G. KENNEDY,
D. A. DE VANNEY.